(12) United States Patent
Katterbauer et al.

(10) Patent No.: US 11,512,576 B2
(45) Date of Patent: Nov. 29, 2022

(54) INTELLIGENTLY CHARACTERIZING RESERVOIRS VIA FLUORESCENT IMAGING ROCK CUTTINGS

(71) Applicant: SAUDI ARABIAN OIL COMPANY, Dhahran (SA)

(72) Inventors: Klemens Katterbauer, Dhahran (SA); Alberto Marsala, Venice (IT); Nouf Jabri, Dhahran (SA); Vera Solovyeva, Moscow (RU)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 101 days.

(21) Appl. No.: 17/075,285

(22) Filed: Oct. 20, 2020

(65) Prior Publication Data

US 2022/0120168 A1    Apr. 21, 2022

(51) Int. Cl.
| | | |
|---|---|---|
| *E21B 34/16* | (2006.01) | |
| *E21B 43/12* | (2006.01) | |
| *E21B 44/00* | (2006.01) | |
| *E21B 47/12* | (2012.01) | |
| *G06K 9/00* | (2022.01) | |
| *H04N 5/30* | (2006.01) | |
| *G06V 20/13* | (2022.01) | |
| *G06V 20/10* | (2022.01) | |

(52) U.S. Cl.
CPC .............. *E21B 44/00* (2013.01); *E21B 34/16* (2013.01); *E21B 43/12* (2013.01); *E21B 47/12* (2013.01); *G06V 20/13* (2022.01); *H04N 5/30* (2013.01); *E21B 2200/02* (2020.05); *G06V 20/194* (2022.01)

(58) Field of Classification Search
CPC .......... E21B 44/00; E21B 34/16; E21B 43/12; E21B 47/12; E21B 2200/02; G06V 20/13; G06V 20/194; H04N 5/30
See application file for complete search history.

(56) References Cited

U.S. PATENT DOCUMENTS

| | | | | |
|---|---|---|---|---|
| 5,571,962 | A * | 11/1996 | Georgi | ................ E21B 21/065 175/46 |
| 8,627,902 | B2 * | 1/2014 | Hammer | ................ E21B 47/11 175/42 |
| 10,808,529 | B2 * | 10/2020 | Ow | ................ G01N 30/7206 |

(Continued)

OTHER PUBLICATIONS

Reyes, Marilyn V., "Application of Fluorescence Techniques for Mud-Logging Analysis of Oil Drilled With Oil-Based Muds", SPE-25355, SPE Formation Evaluation, Society of Petroleum Engineers, Dec. 1994, pp. 300-305 (6 pages).

(Continued)

*Primary Examiner* — Daniel P Stephenson
(74) *Attorney, Agent, or Firm* — Osha Bergman Watanabe & Burton LLP

(57) ABSTRACT

A method includes taking at least one image of a plurality of returned cuttings from a well using a fluorescent imaging camera, analyzing the at least one image with an imaging processing system to obtain detection data including a calculated percentage of a first emitted fluorescent light to formation cuttings, sending the detection data to an analysis and control program to correlate the returned cuttings with a depth in the well, and automatically controlling at least one drilling parameter for drilling the well based on the detection data.

20 Claims, 7 Drawing Sheets

(56) References Cited

U.S. PATENT DOCUMENTS

| | | | |
|---|---|---|---|
| 2005/0252286 A1* | 11/2005 | Ibrahim | G01N 33/2823 73/152.55 |
| 2008/0202747 A1 | 8/2008 | Gleitman et al. | |
| 2009/0087912 A1 | 4/2009 | Ramos et al. | |
| 2009/0151939 A1 | 6/2009 | Bailey et al. | |
| 2010/0044034 A1 | 2/2010 | Bailey et al. | |
| 2010/0193184 A1* | 8/2010 | Dolman | E21B 47/11 175/42 |
| 2010/0243241 A1 | 9/2010 | Hampton et al. | |
| 2013/0068940 A1 | 3/2013 | Jones et al. | |
| 2013/0109597 A1 | 5/2013 | Sarkar et al. | |
| 2014/0116778 A1 | 5/2014 | Deville et al. | |
| 2017/0022804 A1 | 1/2017 | Gupta et al. | |
| 2017/0298726 A1 | 10/2017 | Smith et al. | |
| 2018/0283173 A1 | 10/2018 | Lecolier et al. | |
| 2019/0338637 A1 | 11/2019 | Francois et al. | |
| 2019/0360326 A1 | 11/2019 | Deville et al. | |
| 2020/0116019 A1 | 4/2020 | Ow et al. | |

OTHER PUBLICATIONS

Zheng, Demin et al., "Fluorescent binary ensemble with pattern recognition ability for identifying multiple metalloproteins with applications in serum and urine", RSC Advances, Royal Soceity of Chemistry, vol. 7, Oct. 2017, pp. 50097-50105 (9 pages).

Salvi, Massimo et al., "Automated Segmentation of Fluorescence Microscopy Images for 3D Cell Detection in human-derived Cardiospheres", Scientific Reports, Apr. 2019 (11 pages).

Chang, Yuan-Hsiang et al., "Fluorescence Microscopy Image Processing and Visualization for Analyzing Cell Kinematics, Proliferation and Attachment in Mouse Embryonic Stem Cell Culture", 2016 IEEE 16th International Conference on Bioinformatics and Bioengineering, IEEE Computer Society, 2016, pp. 222-229 (8 pages).

International Search Report issued in corresponding International Application No. PCT/US2021/055708, dated Feb. 8, 2022 (5 pages).

Written Opinion issued in corresponding International Application No. PCT/US2021/055708, dated Feb. 8, 2022 (10 pages).

* cited by examiner

INTELLIGENTLY CHARACTERIZING RESERVOIRS VIA FLUORESCENT IMAGING ROCK CUTTINGS

BACKGROUND

Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole. Drill cuttings, also referred to as "rock cuttings" are rock fragments generated by the drill bit as the drill bit advances along the borehole. Mud logging is the creation of a well log of a borehole by examining the rock cuttings brought to the surface by the circulating drilling mud.

A taggant or "tag" is a chemical or physical marker added to materials to allow various forms of testing of the marked materials. The taggant can be detected using a taggant detector. A physical taggant can take many different forms but is typically microscopic in size, added to the materials at low levels, and simple to detect. The taggant may be encoded based on a specific characteristic (e.g., optical, chemical, electrical, or mechanical characteristic) to act as a virtual "fingerprint." Examples of encoded taggant include microscopic, metallic tags, e.g., between 0.3 and 1.0 millimeters, that have unique multi-digit alphanumeric identification codes. For example, the identification code may be etched into an optically variable (holographic) substrate of the tag. The tags may be suspended in a UV sensitive clear adhesive which is either brushed or sprayed onto any item for authentication or other security purposes.

SUMMARY OF INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to methods that include taking at least one image of a plurality of returned cuttings from a well using a fluorescent imaging camera, analyzing the at least one image with an imaging processing system to obtain detection data, including a calculated percentage of a first emitted fluorescent light to formation cuttings, sending the detection data to an analysis and control program to correlate the returned cuttings with a depth in the well, and automatically controlling at least one drilling parameter for drilling the well based on the detection data.

In another aspect, embodiments disclosed herein relate to methods that include taking at least one image of a plurality of returned cuttings from a well using a camera, analyzing the at least one image with an imaging processing system to identify at least one tag on the returned cuttings and calculate a percentage of the returned cuttings having the at least one tag, inputting the percentage of tagged cuttings into an analysis and control program, sending an output of an adjusted amount of the tag based on the percentage of tagged cuttings from the analysis and control program to a tag injection pump, and using the tag injection pump to pump the adjusted amount of the at least one tag into the well.

In yet another aspect, embodiments disclosed herein relate to systems that include a camera, an image processing system comprising software with instructions to identify a percentage of tagged cuttings from a well in an image from the camera, a tag injection pump having a plurality of tag chambers holding different tags and having a valve positioned at a chamber outlet, a metering pump in fluid communication with the chamber outlets of the plurality of tag chambers, a controller in communication with the valves and the metering pump, and an analysis and control program in communication with the image processing system and the controller in the tag injection pump. The analysis and control program may include instructions for inputting the percentage of tagged cuttings into a well analysis program and sending at least one command to the controller in the tag injection pump based on analysis from the percentage of tagged cuttings.

Other aspects and advantages of the invention will be apparent from the following description and the appended claims.

DETAILED DESCRIPTION

Figure 1:
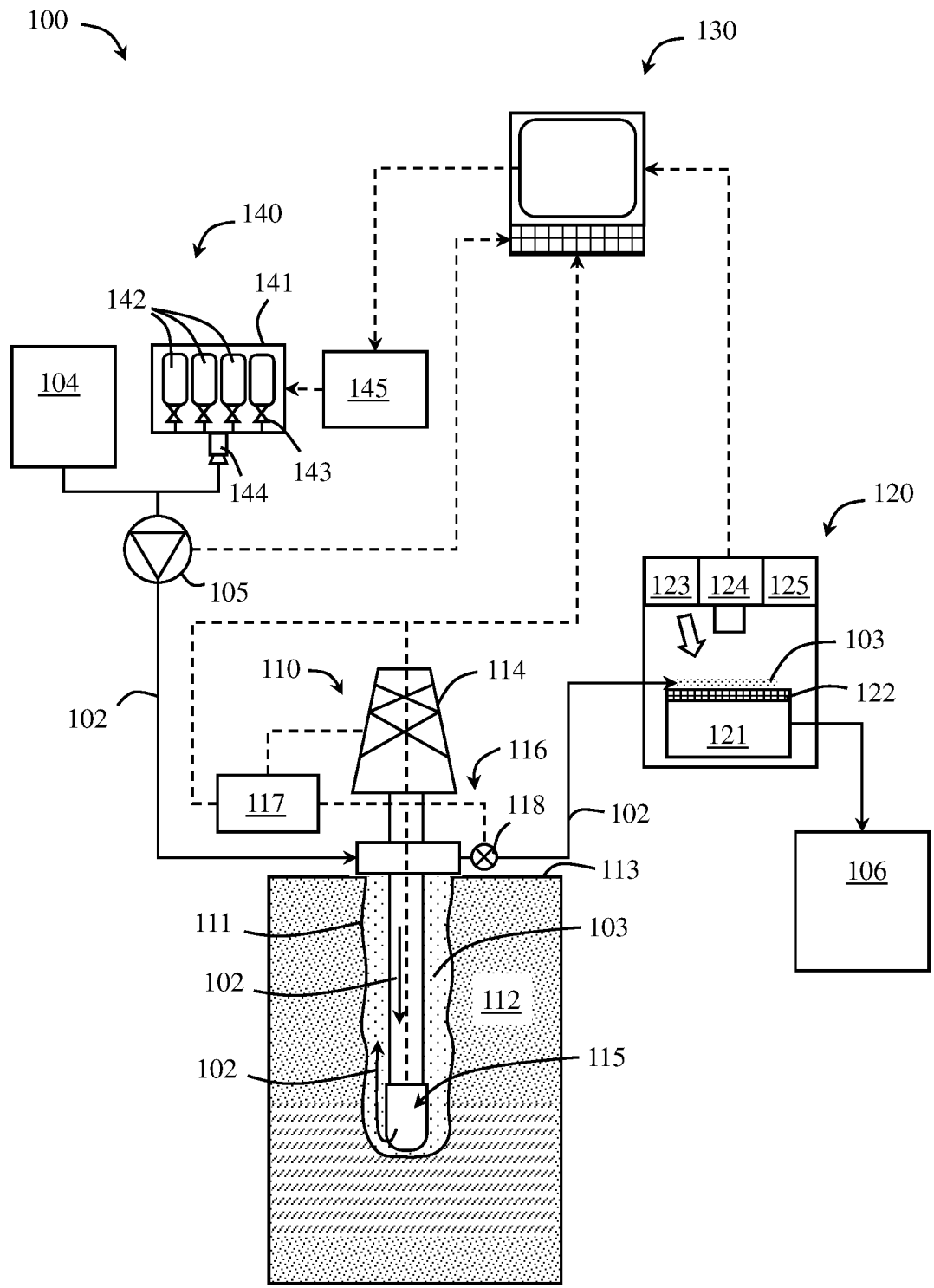
FIG. 1 shows a system according to embodiments of the present disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide methods and systems for depth determination of drilled rock cuttings based on tag detection from tagged returned cuttings. In one or more embodiments, the tags may include fluorescent nanoparticles that are designed to emit an identification color when illuminated with ultraviolet (UV) light. A tag injection pump may control the release of different fluorescent color tags into the drilling fluid in order to ensure that rock cuttings are distinguishable during various stages, and generated at different depths, of the drilling operation. The tags may be injected and transported downhole along the mud stream and attach to the cuttings as the cuttings are produced at the drill bit. Subsequently, tagged cuttings may be detected at the surface to generate detection data. The detection data may include the identification of the tag that is detected and amount (e.g., a calculated percentage) of identified tagged cuttings relative to amount of cuttings returned. The identification of the tag may be used to identify the depth of the drill bit when the particular batch of the tag is released into the mud. The detection data, in addition to mud properties, flow rates, drill volume and penetration rates, formation characteristics, and well specifications (e.g., depth, diameter, geometries, etc.) may be transferred to and analyzed by an analysis and control program. The analysis and control program may send control inputs to an Internet-of-Things (IoT) controller that adapts the parameters of the tag injection pump to achieve an intelligent controlled release of tags to optimize the depth characterization process.

For example, FIG. 1 shows a schematic diagram of a system 100 that may be used to perform methods in accordance with one or more embodiments of the present disclosure. In one or more embodiments, one or more of the modules and/or elements shown in FIG. 1 may be omitted, repeated, and/or substituted. As shown in FIG. 1, the system 100 may include a well system 110, a cuttings return and detection system 120, an analysis and control system 130, and a drilling fluid tagging system 140, which may be directly and indirectly in communication with each other.

The well system 110 may include a well 111 being drilled through a subsurface formation ("formation") 112 to a hydrocarbon-bearing layer of the formation beneath the earth's surface ("surface") 113. The formation 112 may include different layers of rock having varying characteristics, such as varying degrees of permeability, porosity, capillary pressure, and resistivity. In the case of the well system 110 being operated as a production well, the well system 110 may facilitate the extraction of hydrocarbons (or "production") from the hydrocarbon-bearing layer of the formation 112. As the well 111 is drilled through the formation 112, portions of the well may be cased with a casing (extending from the surface of the well) or a liner (extending downhole from an end of a previously installed casing or liner) to line the well wall. The terms "open hole," "borehole," and "wellbore" may be used interchangeably and refer to an uncased portion of a well.

In some embodiments, the well system 110 may include a rig 114 positioned above an opening to the well 111, a well sub-surface system 115, a well surface system 116, and a well control system 117. The well control system 117 may control various operations of the well system 110, such as well production operations, well drilling operations, well completion operations, well maintenance operations, and reservoir monitoring, assessment and development operations. In some embodiments, the well control system 117 may include a computer system that is the same as or similar to that of analysis and control system 130, described below in more detail.

The rig 114 may hold the equipment used to drill a borehole to form the well 111. Major components of the rig 114 may include drilling fluid tanks, drilling fluid pumps (e.g., rig mixing pumps), a derrick or mast, drawworks, a rotary table or top drive, drill string, power generation equipment and auxiliary equipment.

The well 111 may include a borehole that extends from the surface 113 into the formation 112. An upper end of the well 111, terminating at or near the surface 113, may be referred to as the "up-hole" end of the well 111, and a lower end of the well, terminating in the formation 112, may be referred to as the "downhole" end of the well 111. Drilling fluids may be circulated through the well 111 during drilling operations, including, for example, the flow of hydrocarbon production (e.g., oil and gas) from a reservoir to the surface 113 during production operations, the injection of substances (e.g., water) into the formation or reservoir during injection operations, or the communication of monitoring devices (e.g., logging tools) lowered into the well during monitoring operations (e.g., during in situ logging operations).

In some embodiments, during operation of the well system 110, the well control system 117 may collect and record well data for the well system 110. During drilling operations of the well 111, the well data may include, for example, mud properties, flow rates, drill volume and penetration rates, formation characteristics, etc. In some embodiments, the well data may be recorded in real-time, and are available for review or use within seconds, minutes or hours of the condition being sensed (e.g., the measurements are available within 1 hour of the condition being sensed). In such an embodiment, the well data may be referred to as "real-time" well data. Real-time well data may enable an operator of the well 111 to assess a relatively current state of the well system 110, and make real-time decisions regarding development of the well system 110 and the reservoir, such as on-demand adjustments in drilling fluid and regulation of production flow from the well.

In some embodiments, the well surface system 116 may include a wellhead installed at the "up-hole" end of the well, at or near where the well terminates at the surface 113, where the wellhead may include a rigid structure for supporting (or "hanging") casing and production tubing extending into the well 111. Fluid (e.g., production fluid or returning drilling fluid) directed from the well to the surface may flow through the wellhead, after exiting the well 111 and the well sub-surface system 115, including, for example, casing, production tubing, a drill string, and a bottom hole assembly (including a drill bit). In some embodiments, the well surface system 116 may include flow regulating devices that are operable to control the flow of substances into and out of the well 111. For example, the well surface system 116 may include one or more valves 118 that are operable to control the flow of fluid from the well 111. For example, a valve 118 may be fully opened to enable unrestricted flow of production from the well 111, the valve 118 may be partially opened to partially restrict (or "throttle") the flow of fluid from the well 111, and the valve 118 may be fully closed to fully restrict (or "block") the flow of fluid from the well 111, and through the well surface system 116.

In some embodiments, the wellhead may include a choke assembly. For example, the choke assembly may include hardware with functionality for opening and closing the fluid flow through pipes in the well system 110. Likewise, the choke assembly may include a pipe manifold that may lower the pressure of fluid traversing the wellhead. As such, the choke assembly may include a set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system 117. Accordingly, a well control system 117 may obtain well data regarding the choke assembly as well as transmit one or more commands to components within the choke assembly in order to adjust one or more choke assembly parameters (and thus fluid flow rates).

In some embodiments, the well surface system 116 may include surface sensors for sensing characteristics of fluids passing through or otherwise located in the well surface system 116, such as pressure, temperature and flow rate of fluid (e.g., production fluid or drilling fluid) flowing through the wellhead, or other conduits of the well surface system 116, after exiting the well 111. Surface sensors may also include sensors for sensing characteristics of the rig 114 and drilling equipment, such as bit depth, hole depth, hook load, rotary speed, weight on bit, etc.

In FIG. 1, a drilling operation is schematically represented, where the arrowed solid lines represent fluid 102 flow and the dashed lines represent data communication. In a drilling operation, drilling fluid 102 may be pumped from a drilling fluid source 104, which may be, for example, supplied through trucks or tanks, where the drilling fluid source 104 may include a premixed drilling fluid or components provided separately that are mixed on site. In some embodiments, the drilling fluid source 104 may include used drilling fluid from a mud pit 106, which includes drilling fluid that was circulated through the well, returned to the surface and cleaned.

In accordance with one or more embodiments of the present disclosure, a tag may be pumped downhole with the drilling fluid 102 and circulated through the well 111 to tag cuttings as they are formed from drilling. For example, the tags may be fluorescent nanoparticles, where the tags in each of the tag chambers have different colors when illuminated by UV light. Fluorescence refers to a form of luminescence that may emit light when ultraviolet light or other electromagnetic radiation is absorbed. For example, when ultraviolet light is absorbed into a fluorescent tag, the fluorescence tag may emit visible light, which may be referred to as fluorescent light. Fluorescence color tags may include, for example, visible size fluorophores, fluorescent labeled polymeric nanotags, florescent encapsulated nanotags, and quantum dots encapsulated nanotags. A wide range of polymers, quantum dots, dyes and meshes may be used to fabricate the tags including, for example, glass, polypropylene, polyethylene, polystyrene, polyvinylidene fluoride, polyvinyl chloride, polytetrafluoroethylene, polyesters, polyethersulfones, cellulose, nitrocellulose, cellulose acetate, polyvinylidene fluoride, cuprammonium rayon, polysulfone, polyamides, polyurethanes, poly(acrylonitrile), polyacrylamide, epoxy, nylon, polyvinyl chloride resins, polyacrylates, polymethacrylates, poly-2-methacryloyloxyethyl phosphorylcholine or combination of these polymers as block-co-polymers, alternated polymers, cross-linked polymers, star-shaped polymers, branched polymers, dendrimers or composites interwoven polymeric fibers etc. Further, the tags may be formulated to fluoresce at wavelengths corresponding to a color of the visible spectrum (e.g., violet, blue, cyan, green, yellow, orange, and red).

Tags may be supplied from a tag injection pump 141 in the tagging system 140. The tag injection pump 141 may include a plurality of tag chambers 142, each tag chamber 142 holding a different tags and having a valve 143 positioned at a chamber outlet. A metering pump 144 may be in fluid communication with the chamber outlets of the tag chambers 142, such that when tags are released from a tag chamber 142 through the associated valve 143, the tags may be metered into the drilling fluid 102. For example, as drilling fluid 102 is pumped from the drilling fluid source 104 to the well 111, a selected tag may be released from a tag chamber 142 and metered at a selected rate through the metering pump 144.

The valves 143 and metering pump 144 may be operated and controlled using a controller 145. The controller 145 may be integrated with the tag injection pump 141 or may be remote from the tag injection pump 141. The controller 145 may send commands to the valves 143 (e.g., to open or close the valve) and the metering pump 144 (e.g., to control the speed at which the tags are metered through the pump). The controller 145 may also receive signals from the valves 143 and metering pump, for example, signals relaying status of operation. The controller 145 may send commands to implement one or more jobs designed by the analysis and control system 130, discussed in more detail below. For example, the analysis and control system 130 may determine an optimized tag release operation and send instructions to the controller 145 for implementing the optimized tag release operation. The controller 145 may then send commands to one or more valves 143 and the metering pump 144 to release tags from one or more tag chambers 142 at a given speed and on a schedule according to the optimized tag release operation.

One or more pumps 105 may be used to pump the mixed tags and drilling fluid into the well 111 as the well is drilled. The drilling fluid 102 and tags may be pumped through a drill string extending through the well and out of a bottom hole assembly (e.g., through a drill bit) at an end of the drill string. When the tags are ejected out of the bottom of the drill string with the drilling fluid, the tags may attach to the formation being drilled. In some embodiments, hydraulic circulation may be the main driving force for attachment of the tags to the formation, however, the detailed interaction mechanism between the tags and formation depends on the type of tag used and may vary (e.g., chemical interaction, physical attachment, and/or electrostatic interactions). For example, tags may be synthesized with a positive surface charge to interact with the formation. In some embodiments, the tags' surface may be incorporated with functional groups such as amines to form amide bonds with the cuttings exposed to the surface groups. As the formation is drilled, cuttings 103 from the formation having the attached tags may be sent to the surface of the well and analyzed in the cuttings return and detection system 120.

When the drilling fluid 102 and tagged cuttings 103 are pumped to the surface of the well 111 during a drilling operation, the returned drilling fluid may be directed via one or more conduits (e.g., piping) to one or more separators 121 (sometimes referred to in the industry as shakers) in the cuttings return and detection system 120. In some embodiments, returned cuttings may automatically be directed to one or more separators 121 based on commands received from the well control system 117. A separator 121 may include, for example, one or more screens 122 arranged in the flow path of the returned drilling fluid to catch and separate cuttings 103 from the drilling fluid. For example, a separator 121 may have a screen 122 positioned laterally at an upper end of the separator 121, where returned drilling fluid may be flowed over the screen 122 after returning from the well 111. As the returned drilling fluid 102 is flowed over the screen 122, cuttings 103 in the returned drilling fluid 102 may be caught by the screen 122, while the drilling fluid 102 flows through the screen openings. In such manner, cuttings 103 brought up from drilling the well 111 may be captured and held by a screen 122 in a separator 121. In some embodiments, more than one screen and/or more than one separator may be used to separate cuttings from returned drilling fluid. In some embodiments, one or more conveyors may convey screens and/or cuttings along a path, e.g., to move cuttings to a different location for analysis.

A detection system 120 including one or more UV light sources 123 and a camera 124 may be used to illuminate the captured cuttings 103 from the returned drilling fluid 102 and take images of the illuminated cuttings 103. In some embodiments, the UV light source 123 may be provided around the separator 121 in a position to illuminate the cuttings 103 with UV light, and the camera 124 may be positioned above the separator 121 and positioned to take pictures of the cuttings 103 when they are illuminated by the UV light. For example, as shown in FIG. 1, a UV light source 123 and a camera 124 may be held a distance above the top screen 122 of a separator 121 and positioned to face the screen 122. The UV light source 123 and the camera 124 may be positioned adjacent or proximate to each other, such that when the UV light source 123 illuminates cuttings 103 with UV light, the camera 124 may be in a position to take images of the illuminated cuttings 103. In some embodiments, the camera 124, UV light source 123, and separator 121 may be integrated into one equipment unit. In some embodiments, one or more conveyors may be used to convey the captured cuttings 103 a distance from the separator 121 to a separate detection system having at least one UV light source and a camera.

Depending on the return fluid flow rate and amount of cuttings being returned in a drilling operation, separated and captured cuttings may be moved through the separator 121 relatively quickly to allow for a continuous separation operation. To aid in a continuous separation operation, the UV light source 123 may continuously direct UV light towards the collection of cuttings, thereby continuously illuminating the cuttings, and the camera 124 may be controlled to take images of the illuminated cuttings at a rate commensurate with the speed of cutting separation and removal. In some embodiments, the UV light source 123 may be controlled to operate in coordination with the camera 124, such that operation of the UV light source 123 is timed to illuminate the collection of cuttings immediately before and during taking an image of the cuttings with the camera 124, and where the coordinated operation of both the UV light source 123 and camera 124 may be at a rate commensurate with the speed of cutting separation and removal. The camera 124 may be controlled by a timer and/or using a software program to take images at a time when the UV light source is on. For example, a camera 124 may be controlled to take a picture at an interval (e.g., every 5 minutes, every 10 minutes, or at an interval that is tied to a flow rate of returning drilling fluid measured along a flow path between the well 111 and the separator 121), while the UV light source 123 may be controlled to continuously illuminate the separated cuttings or to illuminate the separated cuttings along the same picture taking interval as the camera 124.

An image processing system 125 may be used to analyze images taken by the camera 124 and identify a percentage of tagged cuttings 103 (cuttings that are illuminated an identified color under the UV light) from the total captured cuttings 103 in the image. The image processing system 125 may be provided as part of the detection system 120, for example, where the camera 124 includes software instructions to perform image analysis of the pictures it takes to identify tagged cuttings 103. The detection data, including an identified amount of at least one tag color, may then be sent to the analysis and control system 130, as discussed in more detail below. In some embodiments, the image processing system 125 may be provided as part of the analysis and control system 130, where a camera 124 may send images of captured cuttings 103 to the image processing system in the analysis and control system to be processed and identify tagged cuttings 103. An image processing system 125 may analyze images in real-time, as each image is taken. For example, in some embodiments, an image processing system 125 may analyze a first image taken by a camera 124 and identify a percentage of cuttings tagged with one or more tag colors before the camera 124 takes a second image.

Any available image processing software may be used to process images taken by the camera 124 and identify an amount of at least one tag color in each image. In some embodiments, image processing software may include instructions to divide an image into discrete uniformly sized units (e.g., pixels) and compare the color in each unit. A ratio may be calculated of the different colored units, which may be used to calculate a percentage of cuttings tagged with a selected tag color (which may be captured in the image while the cuttings are illuminated by the UV light) out of the total amount of cuttings detected in the image.

Detection data from the cuttings return and detection system 120 may be sent to the analysis and control system 130, which may include hardware and/or software with functionality for analyzing data collected from the system 100 and/or determining one or more optimized operational plans for the system 100. For example, in one or more embodiments, an analysis and control system 130 may collect data from the system 100 including, e.g., detection data indicating an amount of cuttings 103 that are returned from the well 111 that are tagged with one or more tag colors, tag injection data from the drilling fluid tagging system 140 indicating when and how much of a tag color was pumped into the well 111, and well data, to determine the depth of the drill bit where the cuttings are generated. The depth of the drill bit where the cuttings are generated may be referred to herein as the cuttings' depth of origin. Accurate determination of the cuttings' depth of origin for mud logging may improve the quality in geosteering, well placement, and petrophysical analysis through real-time formation evaluation.

In some embodiments, based on data collected from the system 100, the analysis and control system 130 may determine an optimized operational plan for the drilling fluid tagging system 140. For example, if detection data received from the cuttings return and detection system 120 indicates that two or more tag colors are detected in the returned cuttings 103, the analysis and control system 130 may generate an optimized tag injection plan that includes delaying the release of another tag color. The optimized tag injection plan may be sent to the controller 145 of the drilling fluid tagging system 140, where the controller 145 may send instructions to the tag injection pump 141 to implement the optimized tag injection plan. In such manner, the analysis and control system 130 may analyze detection data to generate injection profiles, which may be sent to and used by the controller 145 to adapt the injection parameters of the tag injection pump 141 for achieving an intelligent controlled release of the taggant. In one or more embodiments, the analysis and control system 130 may generate injection profiles using artificial intelligence and machine learning algorithms.

The analysis and control system 130 may also include a reservoir simulator that includes hardware and/or software with functionality for generating one or more reservoir models regarding the hydrocarbon-bearing formation 112 and/or performing one or more reservoir simulations. The reservoir model and reservoir simulation may be advantageously generated/performed based on the aforementioned improved well placement and petrophysical analysis. Accordingly, the reservoir development planning and/or production operation may be improved based on the result generated by the analysis and control system 130.

The analysis and control system 130 may include an analysis and control program that may be implemented on a computing device located at the well site, or located remote from the well site, such as in the Cloud over the Internet. Further, the analysis and control program may be implemented on a computing device remote from the image processing system 125, the controller 145, and/or the tag injection pump 141. In some embodiments, the image processing system 125, the controller 145, and/or the tag injection pump 141 may be operated in conjunction with the well control system 117 and may be implemented as a combination of hardware and software components of the analysis and control system 130. In some embodiments, the analysis and control system 130 may include a computer system that is similar to the computer system 200 described below with regard to FIGS. 2A and 2B and the accompanying description.

Figure 2A:
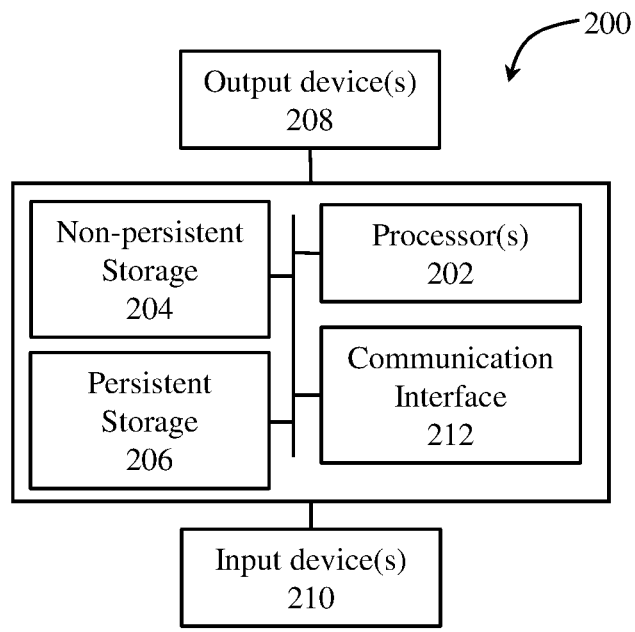
FIGS. 2A and 2B show a computing system in accordance with one or more embodiments.

Embodiments disclosed herein may be implemented on a computing system, including, for example, the analysis and control system 130, the controller 145, and the image processing system 125, as well as one or more control systems used in controlling the well system 110. Any combination of mobile, desktop, server, router, switch, embedded device, or other types of hardware may be used. For example, as shown in FIG. 2A, the computing system 200 may include one or more computer processors 202, non-persistent storage 204 (e.g., volatile memory, such as random access memory (RAM), cache memory), persistent storage 206 (e.g., a hard disk, an optical drive such as a compact disk (CD) drive or digital versatile disk (DVD) drive, a flash memory, etc.), a communication interface 212 (e.g., Bluetooth interface, infrared interface, network interface, optical interface, etc.), and numerous other elements and functionalities.

The computer processor(s) 202 may be an integrated circuit for processing instructions. For example, the computer processor(s) may be one or more cores or micro-cores of a processor. The computing system 200 may also include one or more input devices 210, such as a touchscreen, keyboard, mouse, microphone, touchpad, electronic pen, or any other type of input device.

The communication interface 212 may include an integrated circuit for connecting the computing system 200 to a network (not shown) (e.g., a local area network (LAN), a wide area network (WAN) such as the Internet, mobile network, or any other type of network) and/or to another device, such as another computing device.

Further, the computing system 200 may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 202, non-persistent storage 204, and persistent storage 206. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 2B:
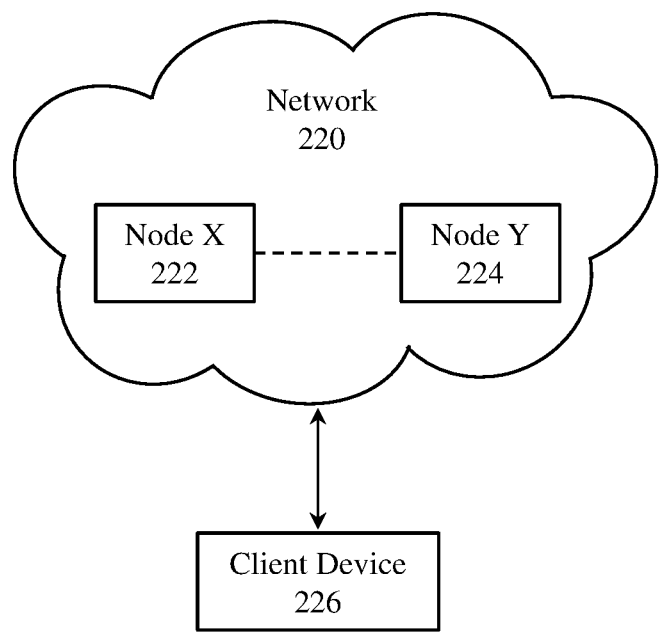

The computing system 200 in FIG. 2A may be connected to or be a part of a network. For example, as shown in FIG. 2B, the network 220 may include multiple nodes (e.g., node X 222, node Y 224). Each node may correspond to a computing system, such as the computing system shown in FIG. 2A, or a group of nodes combined may correspond to the computing system shown in FIG. 2A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 200 may be located at a remote location and connected to the other elements over a network.

Although not shown in FIG. 2B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 222, node Y 224) in the network 220 may be configured to provide services for a client device 226. For example, the nodes may be part of a cloud computing system. The nodes may include functionality to receive requests from the client device 226 and transmit responses to the client device 226. The client device 226 may be a computing system, such as the computing system shown in FIG. 2A. Further, the client device 226 may include and/or perform all or a portion of one or more embodiments of the disclosure.

As described herein, systems for accurate depth of origin determination and well logging may include multiple operational systems (e.g., a well system 110, a cuttings return and detection system 120, an analysis and control system 130, and a drilling fluid tagging system 140) that may be a computing system or include a computing system that communicate and interact with each other (e.g., through a network). For example, according to embodiments of the present disclosure, a system may include a camera, an image processing system including software with instructions to identify a percentage of tagged cuttings from a well in an image from the camera, and a tag injection pump having a plurality of tag chambers, each tag chamber holding a different tag color and having a valve positioned at a chamber outlet, a metering pump in fluid communication with the chamber outlets of the plurality of tag chambers, and a controller in communication with the valves and the metering pump. Systems of the present disclosure may further include an analysis and control program in communication with the image processing system and the controller for the tag injection pump, where the analysis and control program may include instructions for inputting the percentage of tagged cuttings into a well analysis program and sending at least one command to the controller for the tag injection pump based on analysis from the percentage of tagged cuttings. Such elements may communicate with each other electronically (e.g., data transfer), as well as interact with each other physically (e.g., transfer of fluid between systems).

By using systems disclosed herein, one or more methods for accurate depth determination and/or improved well planning may be implemented. For example, according to embodiments of the present disclosure, methods of improved well depth determination may include sending tags having a fluorescent color downhole during drilling to attach to the cuttings and sending the cuttings returned to the surface to a cuttings return and detection system (e.g., 120 in FIG. 1). There, the returned cuttings may be illuminated with a UV light and at least one image of the returned cuttings may be taken using a fluorescent imaging camera. The image(s) of the illuminated cuttings may be analyzed with an imaging processing system (e.g., 125 in FIG. 1) to obtain detection data. Detection data may include, for example, identifying at least one tag on the returned cuttings and calculating a percentage of the returned cuttings having the at least one tag from an amount of detected emitted fluorescent light from the cuttings.

Figure 3:
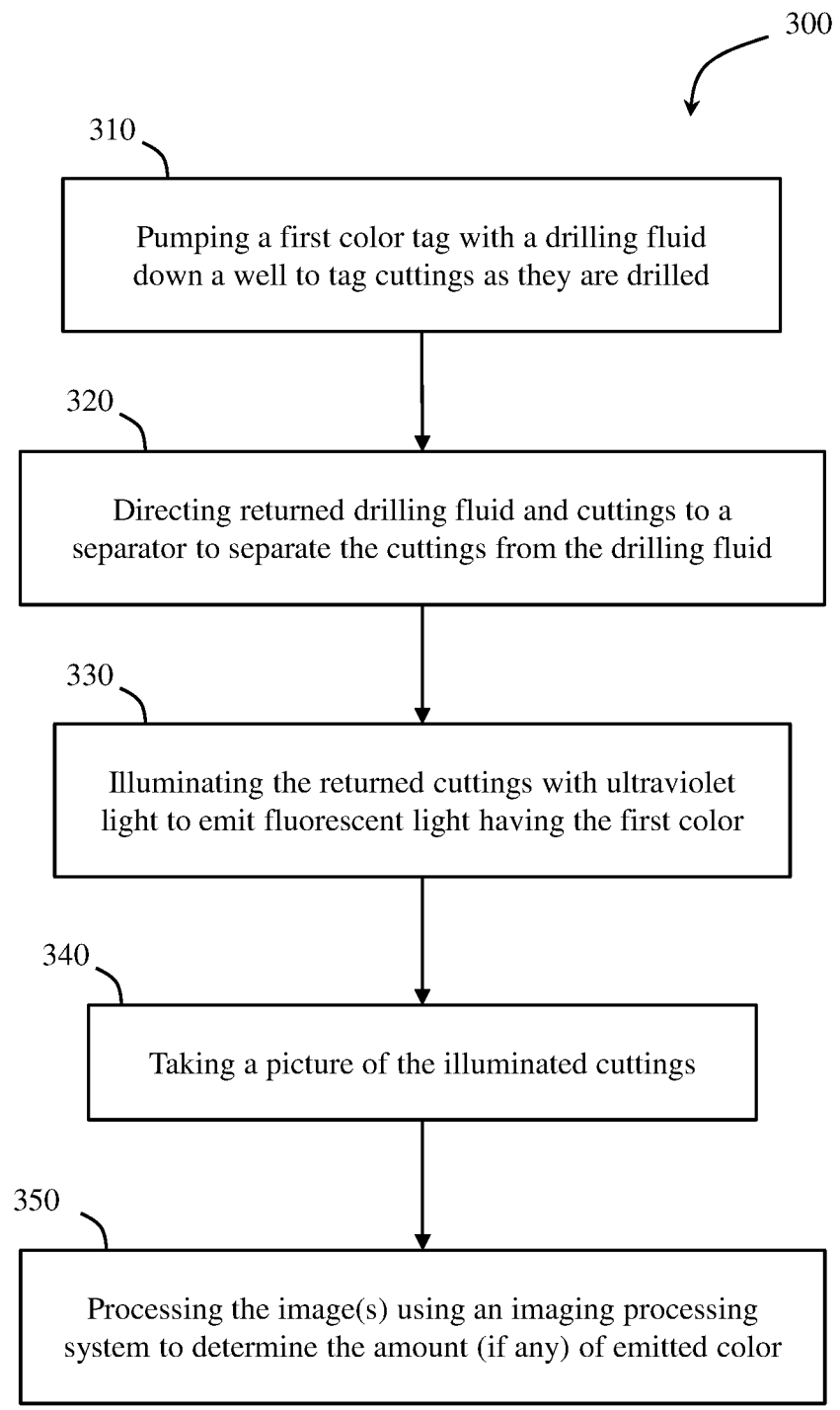
FIG. 3 shows a flowchart of a method according to embodiments of the present disclosure.

For example, FIG. 3 shows an example of a method for depth determination according to embodiments of the present disclosure. The method 300 may include pumping a first fluorescent color tag with a drilling fluid down a well (step 310). For example, a fixed amount of the first fluorescent color tag may be pumped for a selected period of time, for example, based on a tag injection plan determined by an analysis and control program. In some embodiments, the first fluorescent color tag may be continuously pumped with the drilling fluid until the first fluorescent color tag is detected by a cuttings return and detection system (e.g., a calculated percentage of detected first emitted fluorescent light to formation cuttings is greater than zero).

When sent downhole, the first fluorescent color tag may attach to and tag cuttings as the well is drilled. The tagged cuttings may be circulated with the drilling fluid in the well and pumped to the surface of the well. The drilling fluid and cuttings may then be directed to one or more separators to separate the returned cuttings from the drilling fluid (step 320). The returned cuttings may be positioned under a fluorescent imaging camera, and ultraviolet light may be projected onto the returned cuttings to generate fluorescent light having the first fluorescent color emitted from the illuminated first fluorescent color tags on the cuttings (step 330).

When the collected cuttings are illuminated with UV light, the camera may take at least one image of the illuminated cuttings (step 340). Any cuttings that have been tagged with the first fluorescent color tags may emit the first color when illuminated with UV light. The image(s) may be analyzed using an imaging processing system, which may determine the amount (if any) of emitted first color (step 350). The amount of detected emitted color may be used to calculate a percentage of cuttings tagged with the first color tag. No tag color being emitted may indicate, for example, that the tags have not yet completed circulating through the well, that the cuttings have not been properly tagged, or that a broader sample range of cuttings should be tested.

Figure 4:
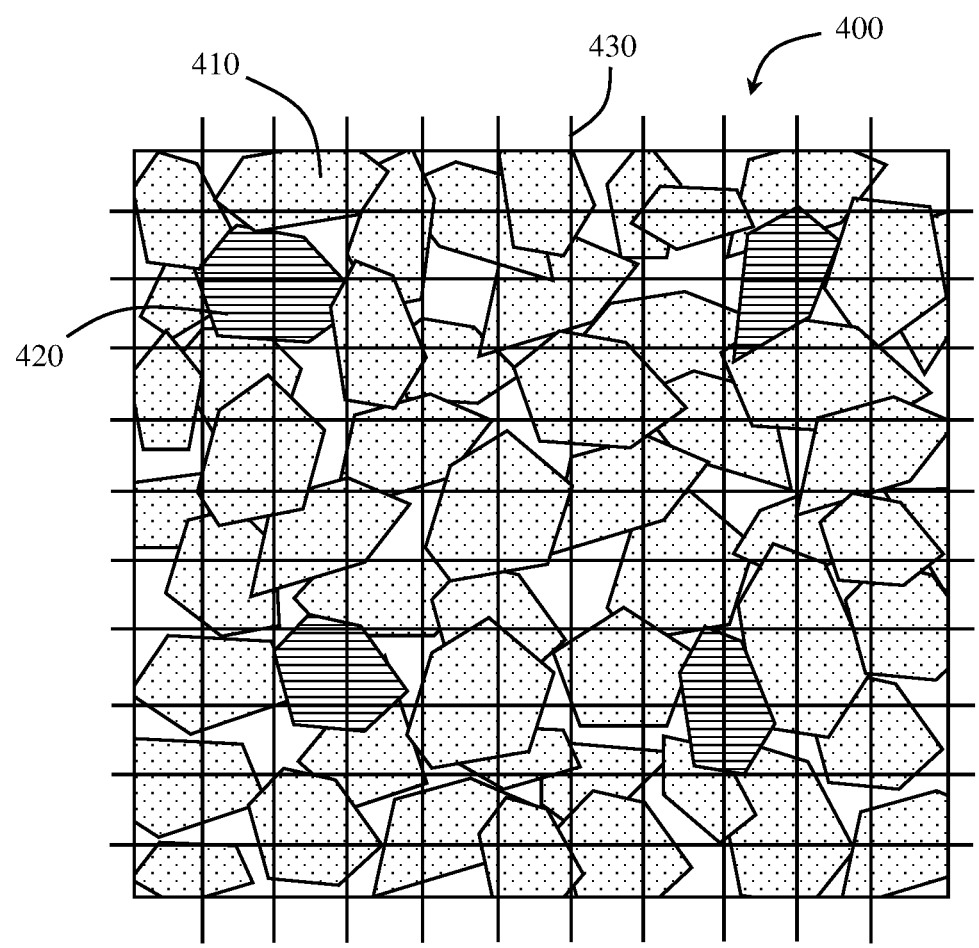
FIG. 4 shows an example of an image of illuminated returned cuttings in accordance with one or more embodiments.

FIG. 4 shows an example of an image 400 of illuminated cuttings 410 returned from a well. As shown, a portion of the returned cuttings 410 tagged with a first fluorescent color tag may emit the first fluorescent color 420 (e.g., blue) when imaged under UV light. An imaging processing system may be used to analyze the image, for example, in a unit by unit analysis of the image, where the unit size may be delineated by a grid 430. Each unit of the image 400 may be processed and compared with other units to determine the amount of cuttings 410 in the image and, of the amount of cuttings, the amount of cuttings that emit the first color 420.

From analyzing the image, the imaging processing system may calculate a percentage of cuttings that emit one or more colors, which may be sent to an analysis and control system, for example, for use in determining next steps in a drilling operation. According to embodiments of the present disclosure, an imaging processing system may analyze one or more images of illuminated returned cuttings to determine a percentage of cuttings that emit one or more colors. By analyzing more than one image (e.g., 10, 20, or more images) of returned cuttings, and thereby increasing the testing sample size, the accuracy of the determined amount of cuttings emitting tag color(s) may be improved.

The steps of sending colored tags downhole to attach to cuttings and analyzing returned cuttings for the presence of the colored tags (e.g., steps 310, 320, 330, 340, 350 in FIG. 3) may be repeated as drilling continues until the colored tags are detected. The presence of the colored tags on the cuttings may be used to indicate which stage of drilling the cuttings originated from. For example, if a first color tag is pumped downhole while a drill bit is thought to be drilling at a first distance from the surface (e.g., as determined from measuring data retrieved during drilling, such as drill string length, metering devices, bit rotational speed, and others), returned cuttings tagged with the first color tag may be correlated with formation properties at the first distance in the well.

According to embodiments of the present disclosure, the steps of sending colored tags downhole to attach to cuttings and analyzing returned cuttings for the presence of the colored tags (e.g., steps 310, 320, 330, 340, 350 in FIG. 3) may be repeated using multiple different colored tags. A different colored tag may be sent down at different stages of drilling to correlate the returned cuttings having each color with the different stages of drilling.

Figure 5:
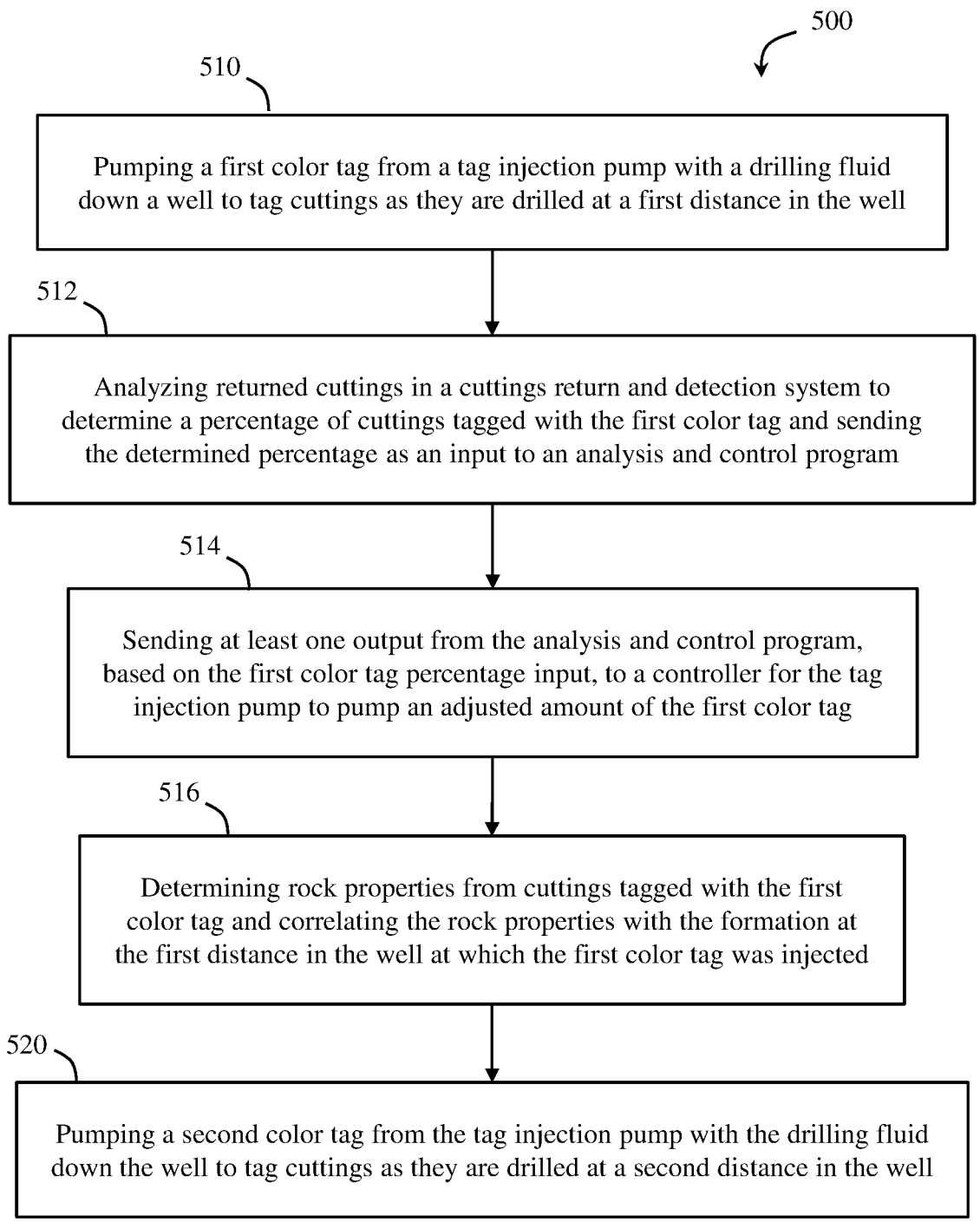
FIG. 5 shows a flowchart of a method according to embodiments of the present disclosure.

For example, FIG. 5 shows an example of a method 500 for pumping different colored tags downhole at different stages according to embodiments of the present disclosure. As shown, the method 500 may include pumping a first color tag with a drilling fluid down a well to tag cuttings as they are drilled at a first distance in the well (step 510). The first color tag may be pumped downhole with the drilling fluid for a preselected amount of time at a selected rate, and/or until the first color tag is detected in the returned cuttings by an imaging processing system. For example, as discussed above, cuttings from the well may be sent to a cuttings return and detection system, where images of returned cuttings being illuminated with UV light may be analyzed using an imaging processing system to determine a percentage of cuttings tagged with the first color tag (step 512).

The imaging processing system may send the percentage of cuttings tagged with the first color tag as an input to an analysis and control program. Based on the received input of the percentage of cuttings tagged with the first color tag, the analysis and control program may determine a plan, which may include, for example, an optimized tag injection plan and/or an optimized drilling plan. The analysis and control program may further receive drilling parameter data inputs (e.g., at least one of drilling fluid properties, drilling fluid flow rate, drilled volume, penetration rate, and well size parameters), which may also be processed and used in determining the optimized tag injection plan and/or optimized drilling plan. An optimized tag injection plan may include, for example, one or more operational steps for injecting tag colors into the drilling fluid, such as an amount of time and/or rate a color tag is metered into the drilling fluid and switching which color tag is being injected into the drilling fluid (e.g., by closing a valve to a first color tag chamber and opening a valve to a second color tag chamber). An optimized drilling plan may include, for example, one or more operational steps for drilling, such as a drilling fluid flow rate, rotational speed of the drill bit, and a direction of drilling.

The analysis and control program may then send one or more outputs to components in the system to implement the plan. For example, the analysis and control program may send an output with instructions for an adjusted amount of the first color tag being injected to a controller for a tag injection pump, where the controller may send a command to the tag injection pump to pump the adjusted amount of the first color tag into the well (step 514). For example, if the color tag percentage input into the analysis and control program indicated that no cuttings were returned with the first color tag, the analysis and control program may send an output to the tag injection system with instructions to continue pumping the first color tag with the drilling fluid. If the color tag percentage input into the analysis and control program indicated that a large amount cuttings were returned with the first color tag, the analysis and control program may send an output to the tag injection system with instructions to stop pumping the first color tag with the drilling fluid.

When the first color tag is detected in the returned cuttings, the cuttings tagged with the first color tag may be analyzed to determine one or more properties of the rock (e.g., resistivity, porosity, type of rock, etc.). The determined properties of the rock may be correlated with the depth in the well at which the first color tag was injected (step 516). In such manner, the first color tag may be used to mark cuttings from a first location in a well, which may be used to map formation properties around the first location in the well.

When the analysis and control program determines that a second color tag (capable of emitting a different color than the first color tag when illuminated with UV light) is to be sent downhole, the analysis and control program may send output(s) to the tag injection controller with instructions to stop pumping the first color tag and to start pumping the second color tag into the drilling fluid to be sent downhole during drilling (step 520). Such instructions may include, for example, at least one of shutting an injector valve in the tag injection pump (e.g., shutting the valve to the first color tag chamber), opening an injector valve (e.g., opening the valve to the second color tag chamber), and setting a speed of a metering pump in the tag injection pump.

Returned cuttings may be continuously analyzed in the cuttings return and detection system to determine if and how many returned cuttings are tagged. Steps 512, 514, and 516 may be repeated with the second color tag (and other subsequently injected colored tags, e.g., a third color tag, a fourth color tag, and so forth) to continuously map formation properties along the well being drilled. For example, when the returned cuttings are analyzed and the second color tag is detected, the cuttings tagged with second color tag may be analyzed to determine one or more properties of the rock, which may then be correlated with the formation around the second location in the well at which the second color tag was injected.

Figure 6:
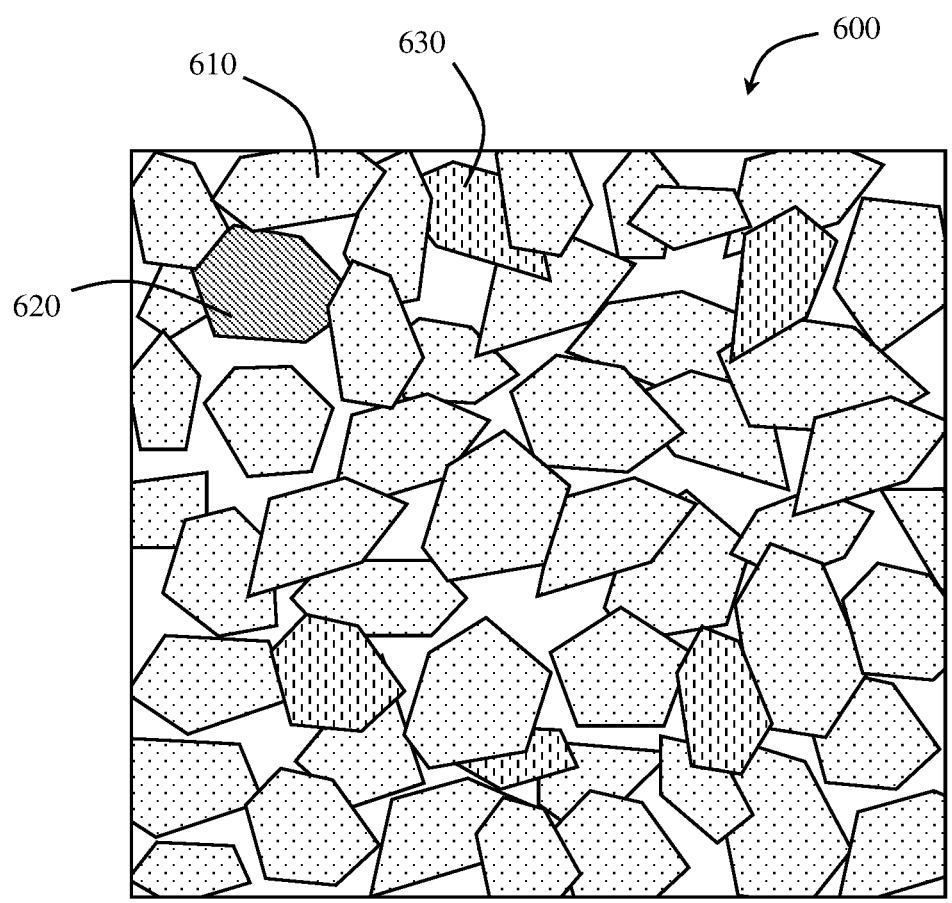
FIG. 6 shows an image of illuminated cuttings according to embodiments of the present disclosure.

In some embodiments, two (or more) different colored tags may be detected in a batch of returned cuttings. For example, FIG. 6 shows an example of an image 600 of illuminated cuttings 610 returned from a well. As shown, a portion of the returned cuttings 610 tagged with a first fluorescent color tag may emit the first fluorescent color 620 (e.g., green) when imaged under UV light, and another portion of the returned cuttings tagged with a second fluorescent color tag may emit the second fluorescent color 630 (e.g., purple) when imaged under UV light. An imaging processing system may be used to analyze the image, for example, in a unit by unit analysis of the image, where each unit of the image 600 may be processed and compared with other units in the image to determine the amount of cuttings 610 in the image and, of the amount of cuttings, the amount of cuttings that emit different colors 620, 630. Based on the colors detected, the detection data may be sent to the analysis and control program to correlate the returned cuttings to different depths in the well.

Figure 7:
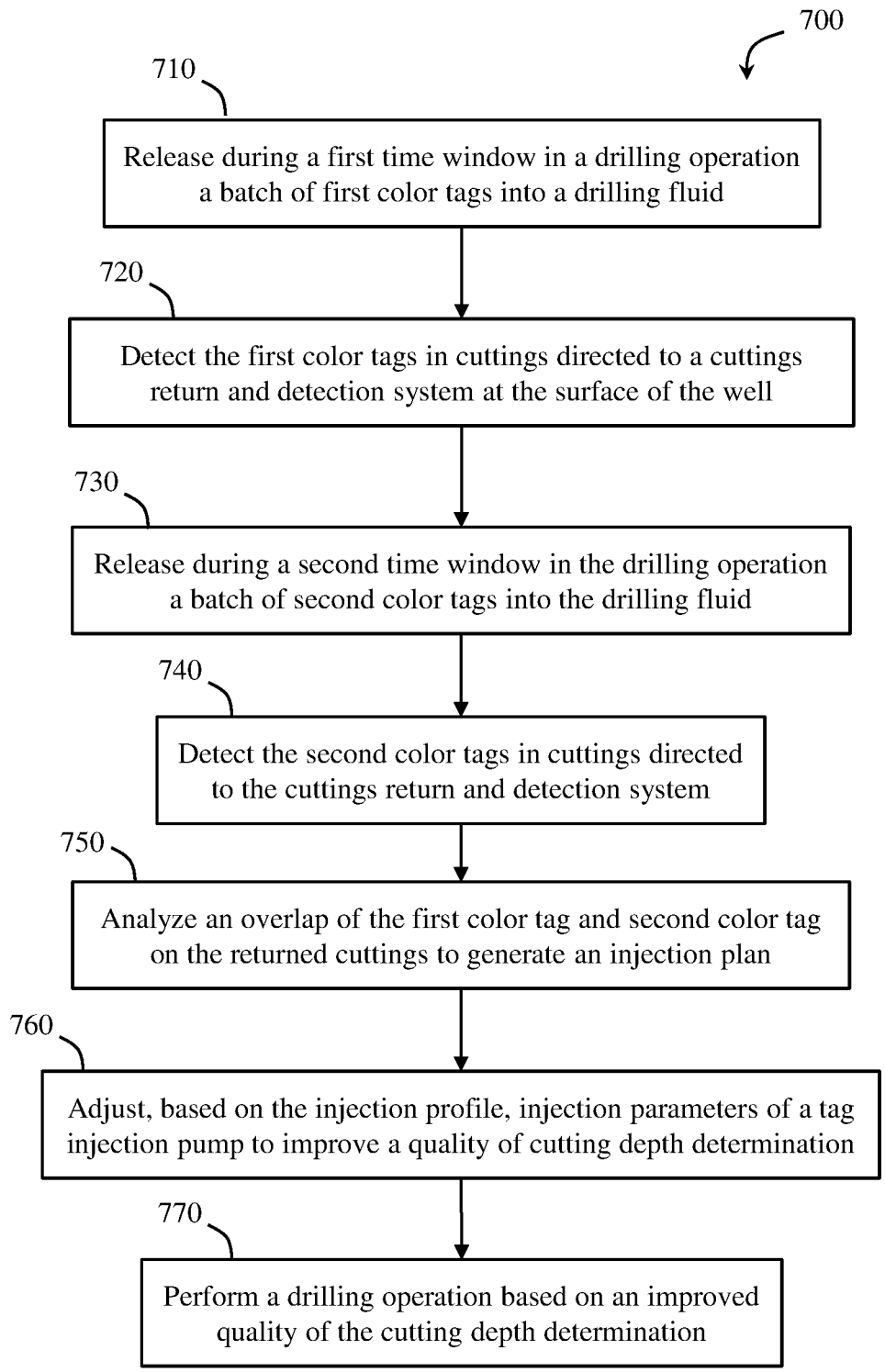
FIG. 7 shows a flowchart of a method according to embodiments of the present disclosure.

FIG. 7 shows another example of methods according to embodiments of the present disclosure including sending multiple colors of tags downhole, which may be used for characterizing the well. One or more steps in FIG. 7 may be performed using one or more components and systems as described herein. While the various steps in FIG. 7 are presented and described sequentially, one of ordinary skill in the art will appreciate that some or all of the steps may be executed in different orders, may be combined or omitted, and some or all of the steps may be executed in parallel and/or iteratively. Furthermore, the steps may be performed actively or passively.

Initially, using a tag injection pump throughout a first time window during a drilling operation, a first batch of first color tags may be released into a drilling fluid (step 710). The first batch of first color tags may be injected according to a first injection plan. Generally, the injection plan may specify various injection parameters such as the quantity of first color tag injected, the injection pressure of the tag injection pump, the degree of shutting and opening of individual injector valves, the injection time window, the time separation from injecting a previous batch of tags (i.e., injection time lag), etc. The first batch of first color tags may be transported downhole by the drilling fluid to impregnate a first batch of cuttings as the first batch of cuttings are produced by a drill bit.

The first batch of cuttings may be directed to a cuttings return and detection system at a surface location, where the first batch of cuttings may be separated from returned drilling fluid and imaged under UV light to detect the presence of the first color tag (step 720). The first batch of first color tags may be transported up-hole along with the first batch of cuttings by the drilling fluid subsequent to impregnating the first batch of cuttings downhole. In one or more embodiments, the amount of first color tags may be proportional to the amount of the first batch of first color tags pumped downhole. In some embodiments, the amount of first color tags detected by the cuttings return and detection system may be less than the amount of the first batch of first color tag, which may indicate (along with other drilling data) lost circulation in the well system.

Using the tag injection pump throughout a second time window subsequent to the first time window during the drilling operation, a second batch of tags may be released into the drilling fluid (step 730). The second batch of tags may be injected according to a second injection plan. The second batch of tags may be transported downhole by the drilling fluid to impregnate a second batch of cuttings as the second batch of cuttings are produced by the drill bit. In one or more embodiments, the second batch of tags may include a second color tag capable of emitting a second color different than the first color tags when illuminated by UV light.

The second batch of cuttings may be directed to the cuttings return and detection system at a surface location, where the second batch of cuttings may be separated from returned drilling fluid and imaged under UV light to detect the presence of the second color tag (step 740). The second batch of tags may be transported up-hole along with the second batch of cuttings by the drilling fluid subsequent to impregnating the second batch of cuttings downhole. The amount of second color tags may be proportional to or less than the amount of the second batch of tags pumped downhole.

Using an analysis and control program, an overlap of detected first color tags and second color tags may be analyzed to generate a third injection plan (step 750). In one or more embodiments, the analysis may include one or more of determining an amount of overlap (a percentage of the first color and a percentage of the second color detected), determining a time gap between detecting the first and second colors, and comparing detection timing and detected tag amounts with the injection parameters used in injecting the first and second batches of tags.

In one or more embodiments, the third injection plan may be substantially the same as the first or the second injection plans when the first color tags and the second color tags are detected separately from each other (no overlap). In one or more embodiments, the third injection plan may be adjusted from the first or the second injection plan when an overlap between the first and second color tags are detected (e.g., as shown in FIG. 6). For example, the tag quantity, injection pressure, and/or injection time lag of the third injection plan may be increased from those of the first and/or second injection plans. In particular, the third injection plan may be adjusted such that a third batch of tags injected according to the third injection plan results in detection of the third batch of tags in returned cuttings that has no overlap with differently colored tags.

In one or more embodiments, the third injection plan may be generated using a machine learning model generated by the analysis and control program. The machine learning model may be trained using a training data set that includes a large number of detected tagged cuttings with corresponding injection plans, as well as associated well site parameters for the drilling operation, such as mud properties, drill bit depth, rate of penetration, formation characteristics, etc. For example, the training data set may include the first injection plan and the second injection plan that yield returned tagged cuttings with different color tags returned at different times (no overlap). In another example, the training data set may include the first injection profile and the second injection profile that yield returned tagged cuttings with different color tags returned at same times (color tag overlap detected). Accordingly, the third injection plan may be generated using the trained machine learning model taking the well site parameters as inputs. In other words, the third injection plan may be dependent on the mud properties, drill bit depth, rate of penetration, formation characteristics, etc. at the time of injecting the third batch of tags. Such dependency may be captured in and modeled by the machine learning model. As a result, a third batch of tags injected according to the third injection plan may yield a distinguishable third batch of tagged cuttings under the well site condition at the time of injecting the third batch of tags.

Based on the third injection plan, the injection parameters of the tag injection pump may be adjusted to improve a quality of the cutting depth determination for mud logging (step 760). In one or more embodiments, the third the injection plan may be sent from the analysis and control program to a tag injection pump controller. Accordingly, the controller may adjust the injection parameters of the tag injection pump based on the injection plan. In one or more embodiments, the analysis and control program may reside on a Cloud server and the controller resides in proximity to the tag injection pump at the well site. In particular, the analysis and control program may communicate with the controller via a network connection (e.g., Internet) to send the injection plans.

Mud logging and/or other drilling operations may be performed based on the improved quality of cuttings depth determination (step 770). For example, mud logging may be performed using the first, second, and third detected color tags in tagged cuttings batches returned with no overlap. During the mud logging, depth measurements of the drill bit may be used to label rock properties of the first, second, and third batches of cuttings based on the first, second, and third batches of tags.

In such manner, detection data obtained from returned cuttings, as well as well data from the drilling operation when tags are sent downhole, may be sent to an analysis and control program to correlate the returned cuttings with a depth in the well. From the depth of origin determination, other well data may be obtained, for example, drilling performance and/or formation characteristics. For example, the analysis and control program may determine at least one formation characteristic (e.g., type of rock, porosity, etc.) at the depth in the well based on the correlation between the returned cuttings with the depth in the well.

According to embodiments of the present disclosure, a method for optimizing a drilling operation may include using a determined depth of origin to determine drilling performance and/or characteristics of the well being drilled. For example, based on the depth of origin determination, an analysis and control program may automatically control at least one drilling parameter for drilling the well (e.g., altering a tag injection parameter, a drilling parameter, and/or a well design parameter). In some embodiments, drilling parameter data (e.g., bit depth, hole depth, hook load, rotary speed, weight on bit, drilling fluid properties, drilling fluid flow rate, drilled volume, penetration rate, and well size parameters, etc.) may also be sent to the analysis and control program to use in determining an optimized drilling operation.

In some embodiments, a depth of origin may be determined for multiple batches of returned cuttings based on different colors of tags returned. The returned cuttings may be analyzed to determine rock properties of the cuttings, which may be correlated with the formation characteristics of the formation at the depths of origin from which each batch of cuttings came. A subsurface map of the well may be generated based on the formation characteristics mapped along the different depths of the well. Further, in some embodiments, at least one drilling parameter may be altered based on the determined formation characteristics, for example, changing a type of drill bit, changing bit rotation speed, initiating lost circulation remediation, altering a flow rate of the drilling fluid, and/or altering a direction of drilling.

Lack of accurate determination of the cuttings' depth of origin may limit the efficacy of conventional mud logging and well planning due to depth uncertainty of several feet (ft), especially in deviated and horizontal wells where cuttings' flows may be delayed due to gravitational debris accumulation, and problematic hydraulics and hole cleaning. Accurate determination of the cuttings' depth of origin may depend on wellbore mud hydraulics, hole cleaning, accurate knowledge of the return-trip delay time up in the annulus, discrimination of cavings and potentially delayed cuttings returning to the surface, etc. Even in normal flow conditions, the depth uncertainties can reach more than 20 ft if the cuttings' upward trip lasts more than 30 minutes. Any inaccuracy in labeling of the collected cuttings further may increase these errors.

However, by correlating returned cuttings to a depth in the well using methods disclosed herein, a more precise map of formation characteristics along the well may be generated, which may be used to generate optimized drilling plans. For example, methods disclosed herein for correlating returned cuttings to a depth in the well may include automatically analyzing color tag presence on returned cuttings via an optical imaging system including one or more UV light sources, a camera and an imaging processing program. The detected color tags may be correlated with the injection parameters of the detected color tag and the drilling parameters during the time the color tag was injected to correlate the tagged returned cuttings to the depth in the well the cuttings came from.

Further, methods of optimizing tag injection plans disclosed herein may be used to improve injection and tagging of different colored tags to prevent overlap between different color tags being returned with cuttings at the same time. By optimizing tag injection plans to return cuttings tagged with different color tags at different times, depth of origin determination may be optimized. According to embodiments disclosed herein, injection of different color tags may be automatically controlled using a central analysis and control program to receive data from one or more parts of the system (e.g., from the detection system, the well system and the tag injection system) and determine one or more optimized injection plans based on the received data analytics.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    taking at least one image of a plurality of returned cuttings from a well using a fluorescent imaging camera;
    analyzing the at least one image with an imaging processing system to obtain detection data, the detection data comprising a calculated percentage of a first emitted fluorescent light to formation cuttings, wherein the first emitted fluorescent light is generated from a first fluorescent color tag;
    sending the detection data to an analysis and control program to correlate the returned cuttings with a depth in the well; and
    adjusting an amount of the first fluorescent color tag pumped with a drilling fluid down the well based on the calculated percentage of the first emitted fluorescent light to formation cuttings to optimize correlation between the returned cuttings and the depth in the well.

2. The method of claim 1, further comprising:
    pumping the first fluorescent color tag with the drilling fluid down the well, wherein the first fluorescent color tag is configured to attach to and tag cuttings as the well is drilled;
    returning the drilling fluid and cuttings from the well to a mud separation unit;
    separating the returned cuttings from the drilling fluid in the mud separation unit;
    positioning the returned cuttings under the fluorescent imaging camera; and
    projecting ultraviolet light on the returned cuttings to generate the first emitted fluorescent light from the first fluorescent color tag.

3. The method of claim 2, wherein a fixed amount of the first fluorescent color tag is pumped for a selected period of time.

4. The method of claim 2, wherein the first fluorescent color tag is continuously pumped with the drilling fluid until the calculated percentage of the first emitted fluorescent light to formation cuttings is greater than zero.

5. The method of claim 1, further comprising sending drilling parameter data to the analysis and control program, the drilling parameter data comprising at least one of drilling fluid properties, drilling fluid flow rate, drilled volume, penetration rate, and well size parameters.

6. The method of claim 1, further comprising using the analysis and control program to determine at least one formation characteristic at the depth in the well based on the correlation between the returned cuttings with the depth in the well.

7. The method of claim 6, further comprising generating a subsurface map of the well, the subsurface map comprising the at least one formation characteristic mapped at the depth of the well.

8. The method of claim 6, wherein the at least one drilling parameter is altered based on the at least one formation characteristic.

9. A method, comprising:
    taking at least one image of a plurality of returned cuttings from a well using a camera;
    analyzing the at least one image with an imaging processing system, comprising:
        identifying at least one tag on the returned cuttings; and
        calculating a percentage of the returned cuttings having the at least one tag;
    inputting the percentage of tagged cuttings into an analysis and control program;
    sending an output based on the percentage of tagged cuttings from the analysis and control program to a tag injection pump, the output comprising an adjusted amount of the at least one tag; and
    using the tag injection pump to pump the adjusted amount of the at least one tag into the well.

10. The method of claim 9, wherein the analysis and control program is located on a computing device remote from the well.

11. The method of claim 9, wherein the output is further based on drilling parameter data, the drilling parameter data comprising at least one of drilling fluid properties, drilling fluid flow rate, drilled volume, penetration rate, and well size parameters.

12. The method of claim 9, wherein the output is sent to a controller on the tag injection pump, and the controller sends at least one command to the tag injection pump to pump the adjusted amount of the at least one tag into the well.

13. The method of claim 12, wherein the at least one command comprises at least one of shutting an injector valve in the tag injection pump, opening the injector valve, and setting a speed of a metering pump in the tag injection pump.

14. The method of claim 12, wherein the at least one command comprises:
stopping pumping a first tag from the tag injection pump; and
pumping a second tag from the tag injection pump.

15. The method of claim 9, further comprising using the analysis and control program to correlate the returned cuttings to a depth in the well.

16. A system, comprising:
a camera;
an image processing system comprising software with instructions to identify a percentage of tagged cuttings from a well in an image from the camera;
a tag injection pump, comprising:
a plurality of tag chambers, each tag chamber holding a different tag and having a valve positioned at a chamber outlet;
a metering pump in fluid communication with the chamber outlets of the plurality of tag chambers; and
a controller in communication with the valves and the metering pump;
an analysis and control program in communication with the image processing system and the controller in the tag injection pump, the analysis and control program comprising instructions for inputting the percentage of tagged cuttings into a well analysis program and sending at least one command to the controller in the tag injection pump based on analysis from the percentage of tagged cuttings.

17. The system of claim 16, wherein the camera is positioned over a separator.

18. The system of claim 16, further comprising an ultraviolet light source positioned proximate the camera.

19. The system of claim 16, wherein the analysis and control program is on a computing device remote from the image processing system and the tag injection pump.

20. The system of claim 16, wherein the different tags comprise fluorescent nanoparticles, wherein the tags in each of the plurality of tag chambers have different colors.

* * * * *